Oct. 7, 1958   W. L. DAVIES   2,854,719
FASTENING DEVICE
Filed Feb. 1, 1955
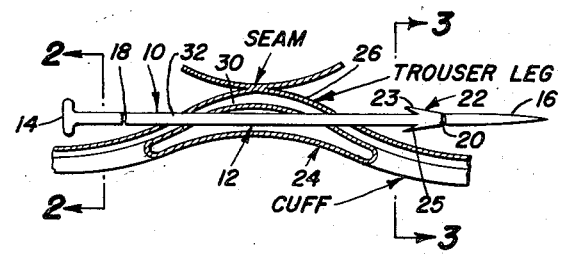
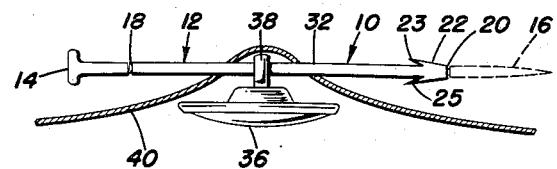
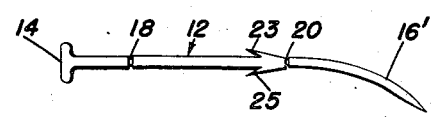
WILKINS L. DAVIES
INVENTOR
BY *Walter G. Finch*
ATTORNEY

United States Patent Office 2,854,719
Patented Oct. 7, 1958

2,854,719

FASTENING DEVICE

Wilkins L. Davies, Baltimore, Md.

Application February 1, 1955, Serial No. 485,457

2 Claims. (Cl. 24—150)

This invention relates generally to a fastening device, and more particularly to a unique pin construction adapted for ordinary fastening of objects to each other.

Although this invention is illustrated in connection with the pinning of a cuff portion of a trouser to the leg portion thereof, it is to be understood that the invention is not limited to this particular application as it may be most readily adapted to other applications, such as the fastening of a button to a dress and the like.

Conventionally, the cuff portion of a pair of pants or a trouser is usually sewed to the leg portion thereof or is pinned thereto by a staple inserted through the cuff and leg portions of the trouser by means of a staple gun. Sewing of the cuff and leg portions together is time consuming and uneconomical.

The use of a staple to hold the cuff and leg portions of a trouser together also has serious disadvantages in that the staple is visible and usually it is pulled out of position, due to stress of wear with the result that the cuff portion of the trouser is separated from the leg portion thereof.

It is, therefore, one of the objects of this invention to provide a unique pin for securely fastening the cuff portion to the leg portion of a pair of pants.

Still another object of this invention is to provide a pin construction which can be utilized for securely and rapidly fastening objects together.

Even still another object of this invention is to provide a pin construction which is economical to manufacture, easy to install and use and which is efficient and reliable in operation.

Still even another object of this invention is to provide a method as well as pin apparatus for fastening and securing materials in a fixed position.

Other objects and many of the attendant advantages of this invention will be readily appreciated as the same becomes better understood by reference to the following detailed description when considered in connection with the accompanying drawing, and in which:

Fig. 1 is a horizontal cross-section taken through the leg and cuff portions of a trouser, illustrating the pin in operating position;

Fig. 2 is a cross-section taken along line 2—2 of Fig. 1;

Fig. 3 is a cross-section taken along line 3—3 of Fig. 1;

Fig. 4 is a horizontal cross-section through a portion of a blouse, illustrating the fastening of a button to the blouse; and Fig. 5 illustrates a second embodiment of the pin comprising this invention.

In accordance with the invention, there is provided a unique pin construction for fastening a cuff portion of a pair of pants or fastening a button having an eye formed therein to a clothed member, such as a blouse.

In one embodiment of the invention, the pin construction comprises a cylindrical shank element which has a flattened head portion at one end thereof and a pointed portion at the other end of the shank element. Spaced depressions are located between the headed and pointed ends of the shank to form weakened portions in the shank element.

A barb means is located between the spaced depressions to prevent the withdrawal of the pin from an object that the pin has been inserted in.

In a second embodiment of the invention, the pointed end of the shank is curved or formed at an angle to facilitate the assembly of a button having an eye portion to an object which the button is to be fastened to.

Referring now to Figs. 1–3 of the drawing, there is shown the unique pin construction 10 which has a shank element 12, an oblong head portion 14 and a pointed end portion 16. Shank 12 can be formed either rectangular in cross-section as shown in Fig. 2, that is, the pin shank 12 and the head portion 14 are flat in the vertical direction, or it may be formed of cylindrical cross-section, and preferably of a brittle metal, such as heat treated steel. It might be preferable, in some instances, to form the pin 10 of a plastic or synthetic resin.

The shank element 12 has a pair of parallel, spaced depressions or weakened portions 18 and 20 formed between the oblong head portion 14 and the pointed end portion 16. The purpose of these depressions 18 and 20 will be explained subsequently.

A barb element 22 having at least two pointed portions 23 and 25 is formed integral with the shank element 12 adjacent the depression 20 and it is located between the depressions or weakened portions 18 and 20.

When the pin 10 is to be used for fastening a cuff portion 24 to a leg portion 26 of a pair of pants or trousers, such as illustrated in Fig. 1, the pointed end portion 16 is passed through the trouser leg portion 26, then through the inner cuff lining 30 and back through the trouser leg portion 26. The pointed end portion 16 is then fractured at the weakened portion 20 and is discarded.

The barb element 22 with its pointed portions 23 and 25 prevent the pin 10 from being displaced from the cuff and leg portions 24 and 26 and thus the pin 10 securely fastens these portions together. When it is desired to remove the pin 10, the second weakened portion or depression 18 is fractured and the head portion 14 and the intermediate section 32 of the shank 12 can be withdrawn from the leg and cuff portions 26 and 24 and discarded.

In Fig. 4, the pin 10 is illustrated in connection with fastening a button 36 having an eye portion 38 formed thereon to an object 40, such as a blouse or the like. Here, the pointed end 16 is passed through the object 40, thence through the eye 38 of the button 36, and finally back through the object 40. The pointed end 16 is fractured at the weakened portion 20 and is discarded. The barb element 22 prevents the pin 10 from being withdrawn as indicated above.

In the embodiment of the invention illustrated in Fig. 5, the pointed end 16' is formed curved or is bent at a slight angle to facilitate the insertion of the end 16' through the eye 38 in the button 36, of Fig. 4.

Obviously many modifications and variations of the present invention are possible in the light of the above teachings. It is, therefore, to be understood that within the scope of the appended claims the invention may be practiced otherwise than as specifically described.

What is claimed is:

1. As an article of manufacture, a pin structure defining a shank element, said shank element having a flattened portion at one end and a pointed portion at the other end thereof, said shank element having spaced depressions to form weakened portions thereon, and means including a plurality of barb elements located between said spaced depressions to prevent the withdrawal of said pin from an object that said pin has been inserted in, with said barb elements pointing in the direction of said flattened portion of said shank.

2. As an article of manufacture, a pin structure defining a shank element, said shank element having a flattened portion at one end and a pointed end at the other end thereof, said shank element having spaced depressions located between said flattened and pointed ends to form weakened portions in said shank elements, and means including at least one barb element located between said spaced depressions and formed integral with said shank element to prevent the withdrawal of said pin from an object that said pin has been inserted in, said barb element pointing in the direction of said flattened portion of said shank element, with said pointed end of said shank being formed at an angle to the main body of the shank.

References Cited in the file of this patent
UNITED STATES PATENTS

| | | |
|---|---|---|
| Re. 22,758 | Gisondi | May 21, 1946 |
| 2,182 | Ballard | July 17, 1841 |
| 605,292 | Ingram | June 7, 1898 |
| 967,924 | Irwin | Aug. 23, 1910 |
| 1,417,818 | Frost | May 30, 1922 |
| 1,439,449 | Schloss | Dec. 19, 1922 |
| 2,061,629 | Huck | Nov. 24, 1936 |
| 2,286,809 | Hutchison | June 16, 1942 |
| 2,292,557 | Wilson | Aug. 11, 1942 |
| 2,401,556 | Di Stiso | June 4, 1946 |
| 2,497,305 | Isaac et al. | Feb. 14, 1950 |
| 2,564,900 | Henriksen | Aug. 21, 1951 |
| 2,624,386 | Russell | Jan. 6, 1953 |
| 2,657,449 | Hillberg | Nov. 3, 1953 |